United States Patent
Kim (10) Patent No.: US 10,974,765 B2
(45) Date of Patent: Apr. 13, 2021

(54) VEHICLE CAPABLE OF DISPLAYING INFORMATION ON ROAD AND CONTROL METHOD THEREFOR

(71) Applicants: HYUNDAI MOTOR COMPANY, Seoul (KR); KIA MOTORS CORPORATION, Seoul (KR)

(72) Inventor: Sun Kyung Kim, Seoul (KR)

(73) Assignees: Hyundai Motor Company, Seoul (KR); Kia Motors Corporation, Seoul (KR)

( * ) Notice: Subject to any disclaimer, the term of this patent is extended or adjusted under 35 U.S.C. 154(b) by 302 days.

(21) Appl. No.: 16/206,833

(22) Filed: Nov. 30, 2018

(65) Prior Publication Data

US 2020/0047807 A1 Feb. 13, 2020

(30) Foreign Application Priority Data

Aug. 7, 2018 (KR) .................. 10-2018-0091728

(51) Int. Cl.
*B62D 15/02* (2006.01)
*G01S 19/42* (2010.01)
(Continued)

(52) U.S. Cl.
CPC ....... *B62D 15/0295* (2013.01); *B62D 15/021* (2013.01); *B62D 15/028* (2013.01);
(Continued)

(58) Field of Classification Search
CPC .................. B62D 15/0295; B62D 15/021; B62D 15/028; G01S 19/42; G03B 21/2033; G03B 33/00
(Continued)

(56) References Cited

U.S. PATENT DOCUMENTS 9,511,723 B2 * 12/2016 Eckert .............. B62D 15/0285
10,752,238 B2 * 8/2020 Kiyokawa ........... G05D 1/0088
(Continued)

FOREIGN PATENT DOCUMENTS

CN 202180779 U * 4/2012
CN 103090288 A * 5/2013 ............ F21S 41/338
(Continued)

OTHER PUBLICATIONS

Ho et al., "Light-Stripe-Projection-Based Target Position Designation for Intelligent Parking-Assist System," 2010, vol. 11, Publisher: IEEE.*

(Continued)

*Primary Examiner* — Tuan C To
(74) *Attorney, Agent, or Firm* — Morgan, Lewis & Bockius LLP (57) ABSTRACT

Disclosed are a vehicle capable of projecting visual information used to guide driving or parking on a road and a control method therefor. The method of displaying information on a road for a vehicle includes recognizing a traveling state, determining at least one of a location or a curvature of a laser assistance line that is to be projected on a road from a front laser projector or a rear laser projector based on the recognized traveling state and a steering angle of the vehicle, and projecting the laser assistance line based on a result obtained from the determining.

19 Claims, 10 Drawing Sheets

(51) Int. Cl.
  *G03B 33/00* (2006.01)
  *G03B 21/20* (2006.01)
(52) U.S. Cl.
  CPC .......... *G01S 19/42* (2013.01); *G03B 21/2033* (2013.01); *G03B 33/00* (2013.01)
(58) Field of Classification Search
  USPC .......................................... 701/41; 340/932.2
  See application file for complete search history.

(56) References Cited

U.S. PATENT DOCUMENTS

| | | | | |
|---|---|---|---|---|
| 10,906,533 | B2* | 2/2021 | Bensemann | B60W 30/06 |
| 2006/0190147 | A1* | 8/2006 | Lee | B62D 15/028 |
| | | | | 701/26 |
| 2006/0271278 | A1* | 11/2006 | Sakakibara | G07C 5/0891 |
| | | | | 701/523 |
| 2008/0129544 | A1* | 6/2008 | Augst | B62D 15/027 |
| | | | | 340/932.2 |
| 2010/0019935 | A1* | 1/2010 | Kawabata | B62D 15/028 |
| | | | | 340/932.2 |
| 2011/0298639 | A1* | 12/2011 | Kadowaki | B62D 15/027 |
| | | | | 340/932.2 |
| 2012/0089294 | A1* | 4/2012 | Fehse | B62D 1/286 |
| | | | | 701/25 |
| 2013/0060421 | A1* | 3/2013 | Kadowaki | B60R 1/00 |
| | | | | 701/36 |
| 2015/0224926 | A1* | 8/2015 | Mochizuki | G06K 9/00798 |
| | | | | 701/36 |
| 2016/0075329 | A1* | 3/2016 | Tomozawa | B62D 15/0285 |
| | | | | 701/41 |
| 2017/0011269 | A1* | 1/2017 | Yamaguchi | G06K 9/00798 |
| 2017/0028902 | A1 | 2/2017 | Diaz | |
| 2018/0056858 | A1* | 3/2018 | Cunningham, III | B60K 35/00 |
| 2018/0105166 | A1* | 4/2018 | Sharma | G05D 1/0246 |
| 2018/0111553 | A1* | 4/2018 | Kubota | B60R 21/00 |
| 2018/0118099 | A1* | 5/2018 | Kunii | B60K 35/00 |
| 2018/0157267 | A1* | 6/2018 | Gao | B62D 15/027 |
| 2018/0345955 | A1* | 12/2018 | Kim | B62D 15/028 |

FOREIGN PATENT DOCUMENTS

| | | | | |
|---|---|---|---|---|
| CN | 107380054 A | * | 11/2017 | B60Q 1/10 |
| JP | 03148086 A | * | 6/1991 | G01S 15/931 |
| JP | 2017007583 A | | 1/2017 | |
| JP | 2017056780 A | | 3/2017 | |
| JP | 6249339 B2 | * | 12/2017 | |
| JP | 2018037001 A | * | 3/2018 | |
| JP | 6366881 B2 | * | 8/2018 | G08G 1/16 |
| KR | 101288069 B1 | * | 7/2013 | B62D 15/0295 |
| KR | 10-2015-1578653 B1 | | 12/2015 | |
| KR | 10-2016-0120566 A | | 10/2016 | |
| KR | 10-2017-0112689 A | | 10/2017 | |
| WO | WO-2016136720 A1 | * | 9/2016 | G07B 15/00 |

OTHER PUBLICATIONS

Martin et al., "Backscattering Elimination in Fog for Advanced Driver Assistance Systems with LED Matrix Headlights," 2016, Publisher: IEEE.*

Yoshito et al., "A flying Projector stabilizing Image Fluctuation," 2014, Publisher: IEEE.*

S. Raboisson et al., "Obstacle Detection in Highway Environment by Colour CCD camera and Image Processing Prototype installed in a Vehicle," 1994, Publisher: IEEE.*

Arjun et al., "Vision based Road Surface Detection for Automotive Systems," 2012, Publisher: IEEE.*

* cited by examiner

VEHICLE CAPABLE OF DISPLAYING INFORMATION ON ROAD AND CONTROL METHOD THEREFOR

This application claims the benefit of Korean Patent Application No. 10-2018-0091728, filed on Aug. 7, 2018 in the Korean Intellectual Property Office, which is hereby incorporated by reference as if fully set forth herein.

TECHNICAL FIELD

The present disclosure relates to a vehicle capable of displaying information on a road and a control method therefor, and more particularly, to a vehicle capable of projecting visual information used to guide driving or parking on a road and a control method therefor.

BACKGROUND

Due to the recent development of various sensors, cameras and display technologies, various information is provided to drivers in various forms in order to assist driving of the vehicle. The form in which such information is provided will be described with reference to FIGS. 1A-1C.

Figure 1A:
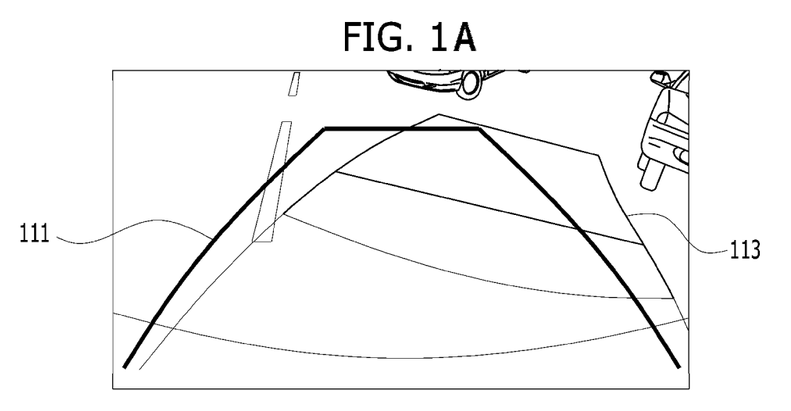
FIGS. 1A-1C show exemplary forms in which information is provided to a driver of a general vehicle.
Figure 1B:
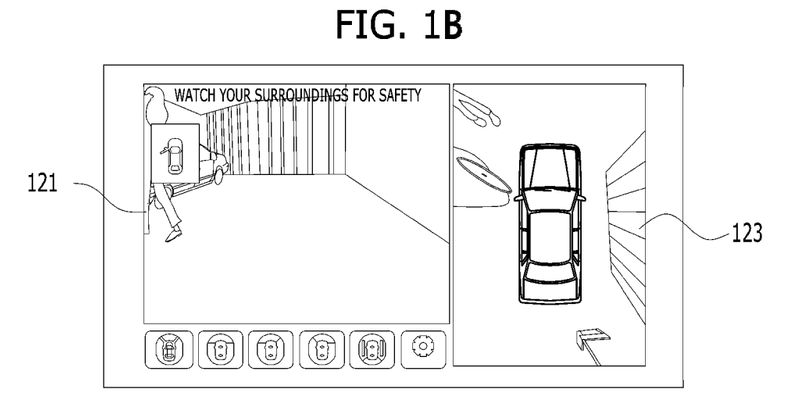
Figure 1C:
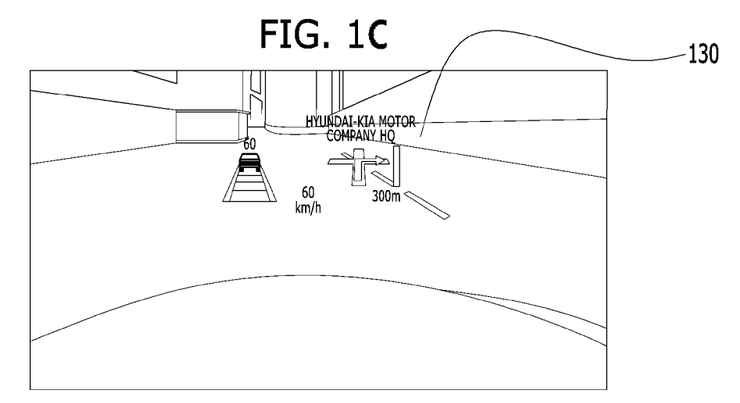

FIGS. 1A-1C show exemplary forms in which information is provided to a driver of a general vehicle.

Referring to FIG. 1A, when the R-range is input, an image of a rear view camera is displayed through a display of a head unit. At this time, a guide line 111, indicating the traveling path that the vehicle will take when traveling straight forwards and backwards and the width of the vehicle, and a guide line 113, indicating the traveling path that the vehicle will take when the steering wheel is turned, may be displayed in the corresponding image.

FIG. 1B shows a screen in which an around-view-monitor (AVM) function is executed using a plurality of cameras mounted at different positions. Here, an image captured by a specific camera may be displayed in one region 121 of the screen, and a top view image showing a periphery of the vehicle when looked down from above, which is obtained by processing and synthesizing images captured by a plurality of cameras, may be displayed in another region 123 of the screen.

As shown in FIG. 1C, the current vehicle speed and navigation information 130 may also be displayed through a head-up display (HUD).

However, even when an image of a rear view camera is provided, as shown in FIG. 1A, there is a possibility of colliding with a pedestrian or a vehicle that appears suddenly behind the vehicle, and a large display error is generally caused by screen distortion. In addition, the AVM function shown in FIG. 1B has low visibility, and is useful only for confirmation of a parking line or a nearby obstacle because image distortion rapidly increases as the distance from the vehicle increases. In addition, in the HUD shown in FIG. 1C, only limited information is displayed for the purpose of prevention of negligence in looking ahead. Further, some drivers may have difficulty in accurately recognizing a travel direction change point using only distance information displayed through the HUD.

Therefore, there has been demand for a technology of eliminating image distortion due to an image display method of a camera or enabling a driver to intuitively and effectively confirm information necessary for driving or parking with the naked eye.

SUMMARY

Accordingly, the present disclosure is directed to a vehicle capable of displaying information on a road and a control method therefor that substantially obviate one or more problems due to limitations and disadvantages of the related art.

An object of the present disclosure is to provide a vehicle capable of effectively providing a driver with information necessary for driving or parking and a control method therefor.

Additional advantages, objects, and features of the disclosure will be set forth in part in the description which follows and in part will become apparent to those having ordinary skill in the art upon examination of the following or may be learned from practice of the disclosure. The objectives and other advantages of the disclosure may be realized and attained by the structure particularly pointed out in the written description and claims hereof as well as the appended drawings.

To achieve these objects and other advantages and in accordance with the purpose of the disclosure, as embodied and broadly described herein, a method of displaying information on a road for a vehicle includes recognizing a traveling state, determining at least one of a location or a curvature of a laser assistance line that is to be projected on a road from a front laser projector or a rear laser projector based on the recognized traveling state and a steering angle of the vehicle, and projecting the laser assistance line based on a result obtained from the determining.

In another aspect of the present disclosure, a vehicle includes a traveling state recognition device for recognizing a traveling state, a steering angle sensor for sensing a steering angle, a laser projector for projecting a laser assistance line on a road, and a projection information controller for determining at least one of a location or a curvature of the laser assistance line that is to be projected on a road from the laser projector based on the recognized traveling state and the steering angle. The laser projector includes at least one of a front laser projector or a rear laser projector, and projects the laser assistance line based on a determination result of the projection information controller.

It is to be understood that both the foregoing general description and the following detailed description of the present disclosure are exemplary and explanatory and are intended to provide further explanation of the disclosure as claimed.

BRIEF DESCRIPTION OF THE DRAWINGS

The accompanying drawings, which are included to provide a further understanding of the disclosure and are incorporated in and constitute a part of this application, illustrate embodiment(s) of the disclosure and together with the description serve to explain the principle of the disclosure. In the drawings.

DETAILED DESCRIPTION

Reference will now be made in detail to the preferred embodiments of the present disclosure, examples of which are illustrated in the accompanying drawings. However, it will be understood that the present disclosure should not be limited to the embodiments and may be modified in various ways. In the drawings, to clearly and briefly explain the present disclosure, an illustration of elements having no connection with the description is omitted, and the same or extremely similar elements are designated by the same reference numerals throughout the specification.

Throughout the specification, when an element is referred to as "including" another element, the element should not be understood as excluding other elements so long as there is no special conflicting description, and the element may include at least one other element. Wherever possible, the same reference numbers will be used throughout the drawings to refer to the same or like parts.

According to an embodiment of the present disclosure, a laser projector is provided at the front side and/or the rear side of a vehicle, and information necessary for vehicle driving is projected on a road using the laser projector so that not only a driver but also nearby pedestrians or vehicles may confirm the information projected on the road.

For example, the vehicle according to the embodiment may project the following information on the road in specific forms (e.g. a straight line, a curved line, an arrow, a figure, etc.) using laser beams: (i) at least one of the width of the vehicle or an expected traveling direction depending on steering when traveling on a narrow path or when parked, or (ii) a direction change when the traveling direction displayed in a navigation system is changed (e.g. right turn, left turn, etc.). Unless specifically stated, for the sake of convenience of description, it is assumed that the laser beam is projected on the road in a line form. However, the form in which the laser beam is projected on the road is not limited thereto. For example, the laser beam projected on the road may take the form of an assistance line. Specifically, the assistance line may include a left laser assistance line and a right laser assistance line. The left laser assistance line and the right laser assistance line may be spaced apart from each other by a distance corresponding to the width of the vehicle, and may have a straight-line or curved-line shape depending on the steering angle.

Figure 2:
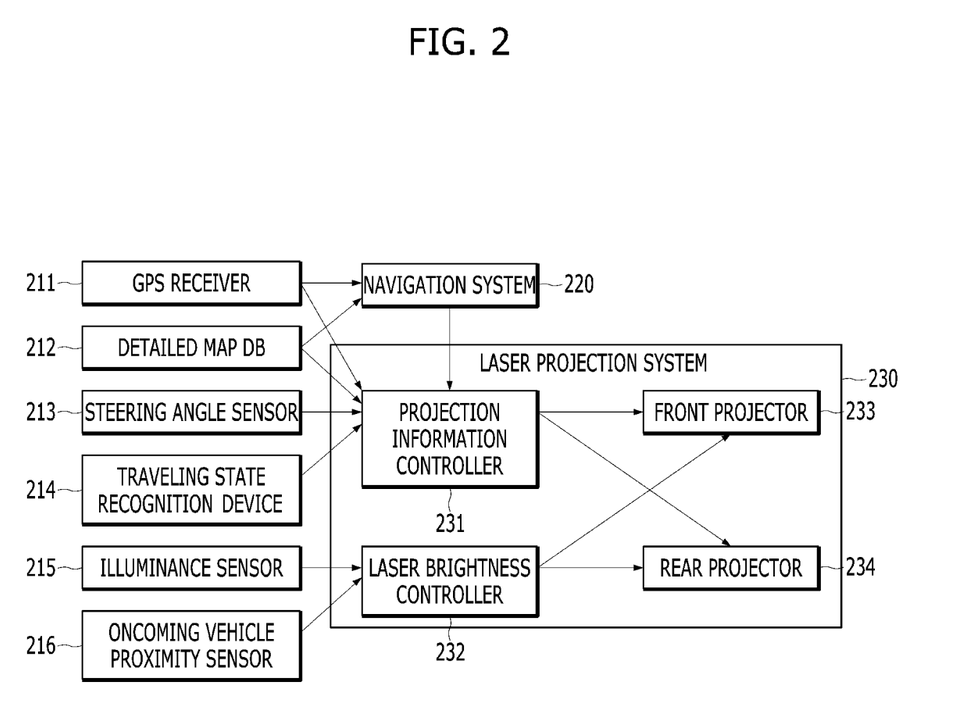
FIG. 2 shows an example of a configuration of a vehicle to which embodiments of the present disclosure are applicable.

First, a configuration of a vehicle to which embodiments of the present disclosure are applicable will be described with reference to FIG. 2. FIG. 2 shows an example of the configuration of a vehicle to which embodiments of the present disclosure are applicable.

Referring to FIG. 2, a vehicle according to an embodiment may include a GPS receiver 211, a detailed map database 212, a steering angle sensor 213, a traveling state recognition device 214, an illuminance sensor 215, an oncoming vehicle proximity sensor 216, a navigation system 220, and a laser projection system 230. Of course, depending on the embodiment, the vehicle may additionally include more components, such as a smart parking assistance system (SPAS), an advanced driver assistance system (ADAS), and the like. Alternatively, at least some of the components shown in FIG. 2 may be omitted.

The GPS receiver 211, the detailed map database 212, the steering angle sensor 213, the illuminance sensor 215 and the navigation system 220 are components, the functions and structures of which are obvious to those skilled in the art. Thus, a detailed description thereof will be omitted except for parts changed in order to realize the embodiment. The oncoming vehicle proximity sensor 216 may be a sensor that is used for an auto high beam assist function that automatically dips headlights when an oncoming vehicle approaches.

The laser projection system 230 may include a projection information controller 231, a laser brightness controller 232, a front projector 233, and a rear projector 234.

The projection information controller 231 determines whether the vehicle is in a forward traveling state, a backward traveling state or a stopped state through the traveling state recognition device 214, and determines the forward/backward projection direction of the laser beam. In addition, the projection information controller 231 may control the curvature and projection position of the laser beam so that the laser beam indicates the vehicle traveling direction, which is determined based on the steering movement of the steering wheel, which is sensed by the steering angle sensor 213, or based on other circumstances (e.g. the parking path determined by the SPAS). In addition, the projection information controller 231 may confirm the current location of the vehicle through the GPS receiver 211, a detailed map of the neighboring roads through the detailed map database 212, and the traveling route through the navigation system 220, and may control the curvature of the laser beam so that the laser beam indicates the turning direction when the vehicle approaches a turning point. In addition, in the case in which the front and rear projectors 233 and 234, which will be described later, are configured to output a plurality of colors, the projection information controller 231 may perform control such that laser beams of different colors are output to respective locations. In particular, when it is detected that another neighboring vehicle is projecting a laser beam on the road through the around-view-monitor (AVM) system or the front and rear view cameras, the projection information controller 231 may confirm the color of the corresponding laser beam, and may perform control such that a laser beam having a color different from the confirmed color is projected.

The laser brightness controller 232 may adjust the brightness of the laser beam by measuring the external illuminance through the illuminance sensor 215 located outside the vehicle. Upon determining that another vehicle is located at a laser projection spot through the oncoming vehicle proximity sensor 216, the laser brightness controller 232 may perform control such that a laser beam is not projected on the corresponding spot. In addition, upon determining that an obstacle is present in front of or behind the vehicle through an obstacle-sensing device such as radar of the ADAS, the laser brightness controller 232 may also prevent projection of the laser beam on the spot where the corresponding obstacle is located.

The front and rear projectors 233 and 234 use a laser beam source depending on the position, direction and curvature, which are determined by the projection information controller 231, or depending on the brightness and restricted projection spot, which are determined by the laser brightness controller 232, thereby securing visibility both during the day and at night. The front projector 233 may be disposed at the front side of the vehicle so as to project a laser beam to the region ahead of the vehicle, and the rear projector 234 may be disposed at the rear side of the vehicle so as to project a laser beam to the region behind the vehicle. For example, the front projector 233 may be disposed near the headlamps or at both lateral sides of the vehicle, but this is merely illustrative. The arrangement position of the front projector 233 is not limited to a specific position, as long as the front projector 233 can radiate a laser beam to a desired spot ahead of the vehicle in a desired form. Each of the front and rear projectors 233 and 234 may be configured such that a plurality of laser beam sources is arranged in a predetermined type of array so as to be independently controlled in order to radiate a laser beam to a desired spot in a desired form. The radiation angles of at least some of the laser beam sources may be adjustable vertically and/or horizontally by actuators. The mechanical configuration of each of the front and rear projectors 233 and 234 is not limited to a specific configuration, as long as the front and rear projectors 233 and 234 can radiate a laser beam to a desired spot in a desired form.

Figure 3:
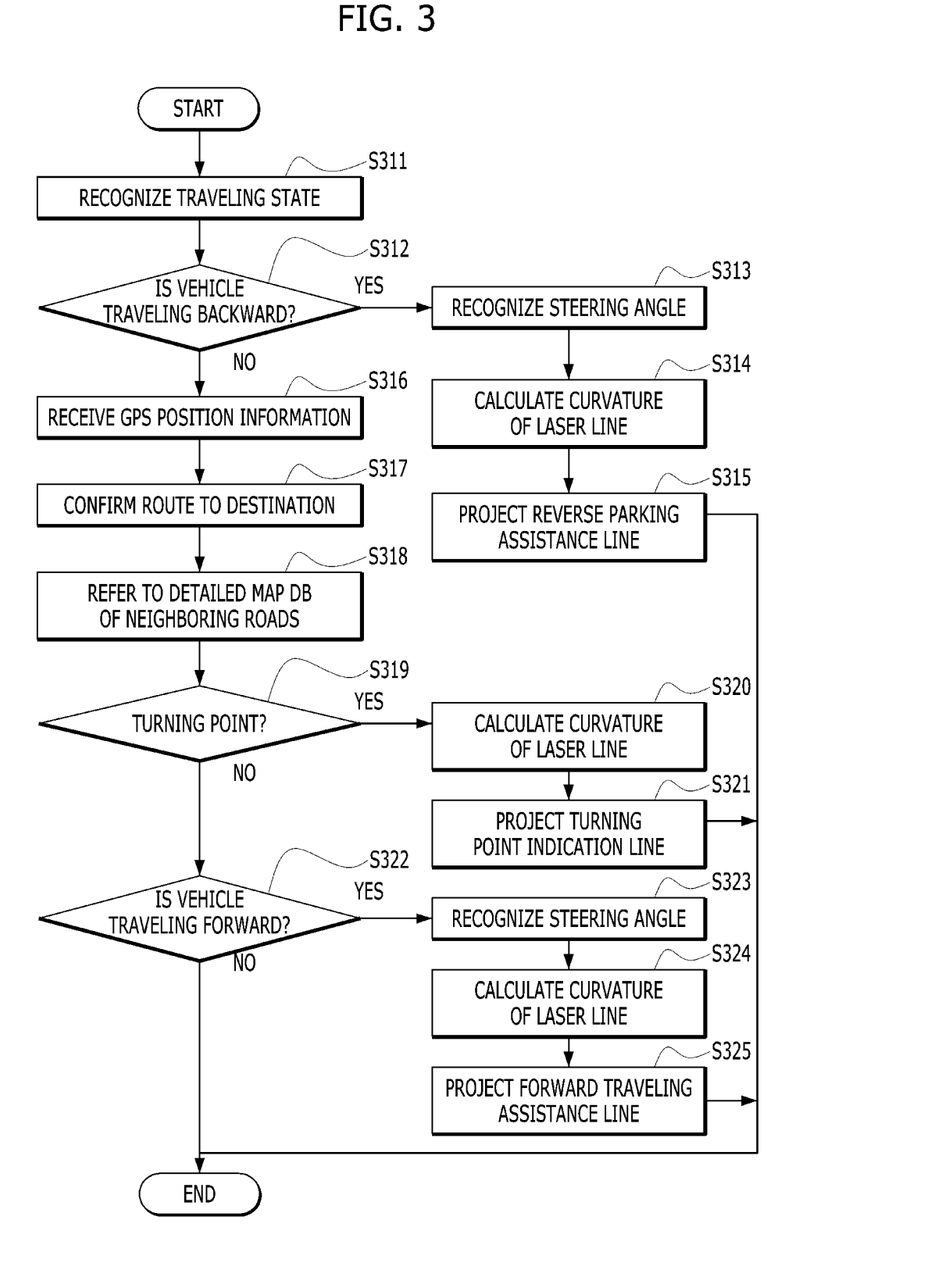
FIG. 3 is a flowchart showing an example of a process of displaying information on a road in the vehicle according to an embodiment of the present disclosure.

A control process of displaying information on the road using the above-described configuration of the vehicle will be described with reference to FIG. 3. FIG. 3 is a flowchart showing an example of a process of displaying information on the road in the vehicle according to an embodiment of the present disclosure.

Referring to FIG. 3, when the vehicle is started, the traveling state thereof may be recognized (S311). This process may be performed in order to recognize whether the vehicle is in a forward traveling state, a stopped state or a backward traveling state by the traveling state recognition device 214 shown in FIG. 2.

When the vehicle is in the backward traveling state (YES in S312), the projection information controller 231 may recognize the steering angle of the steering wheel using the information from the steering angle sensor 213 (S313), may calculate the curvature of a laser beam indicating the backward traveling direction, determined based on the recognized steering angle, and the width of the vehicle (S314), and may project a reverse parking assistance line through the rear projector 234 (S315).

On the other hand, when the vehicle is determined not to be in the backward traveling state (i.e. the vehicle is in the forward traveling or stopped state, NO in S312), based on GPS position information received in S316, a route to the destination in the navigation system confirmed in S317 and the detailed map database of the neighboring roads referred to in S318, the projection information controller 231 may determine whether the vehicle is located near a turning point (S319).

Subsequently, when the vehicle is located near a turning point (YES in S319), the projection information controller 231 may calculate the curvature of a laser beam so that the laser beam indicates the turning point and the direction of the vehicle based on the information obtained in the previous processes (S316, S317 and S318) (S320), and may project a line for indicating the turning point through the front projector 233 (S321).

When the vehicle is not located near a turning point (NO in S319) and the vehicle is in the forward traveling state (YES in S322), the projection information controller 231 may recognize the steering angle of the steering wheel using the information from the steering angle sensor 213 (S323), may calculate the curvature of a laser beam indicating the forward traveling direction, determined based on the recognized steering angle, and the width of the vehicle (S324), and may project a forward traveling assistance line through the front projector 233 (S325).

Hereinafter, concrete forms in which laser beams are projected in various situations will be described with reference to FIGS. 4A to 9B.

The form in which a forward traveling assistance line is displayed will now be described with reference to FIGS. 4A to 5B.

Figure 4A:
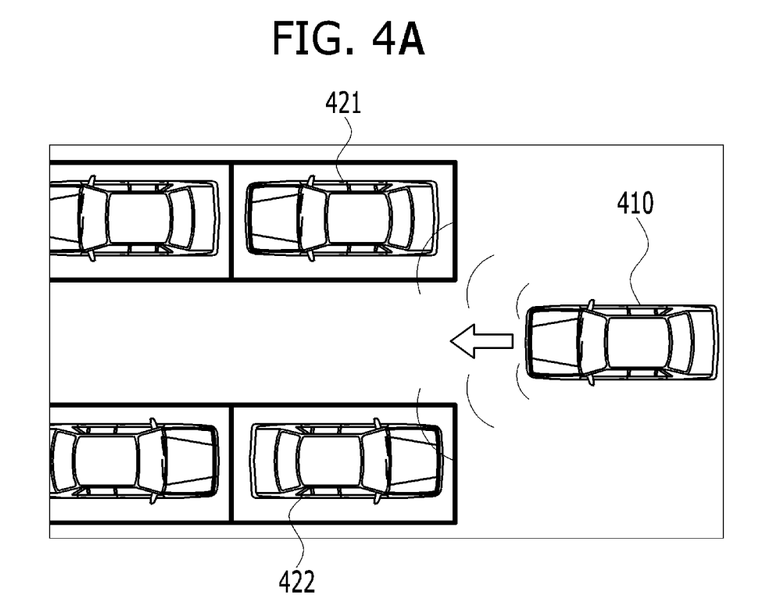
FIGS. 4A and 4B show an example of a form in which a forward traveling assistance line is displayed when the vehicle travels on a narrow path according to an embodiment of the present disclosure.
Figure 4B:
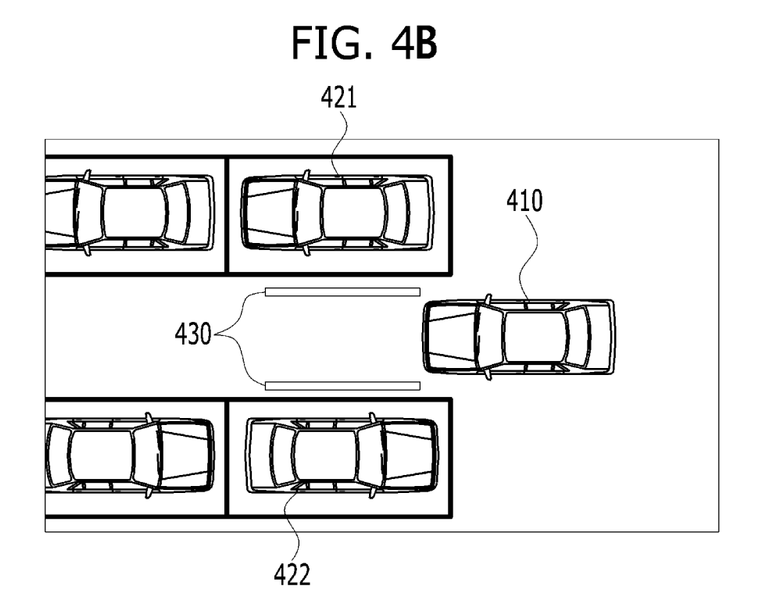

FIGS. 4A and 4B show an example of the form in which a forward traveling assistance line is displayed when the vehicle travels on a narrow path according to an embodiment of the present disclosure.

Referring to FIG. 4A, obstacles 421 and 422, which are present in front of a vehicle 410, may be sensed by a front sensor of the ADAS or the like, and it may be determined that the vehicle will pass through a narrow path between the obstacles 421 and 422.

In this case, as shown in FIG. 4B, the projection information controller 231 may control the front projector 233 to project a forward traveling assistance line 430, which indicates the width of the vehicle, on the road so that the driver may determine whether the vehicle 410 can pass through the path between the obstacles 421 and 422 and may estimate an expected traveling route before entering the path between the obstacles 421 and 422.

Figure 5A:
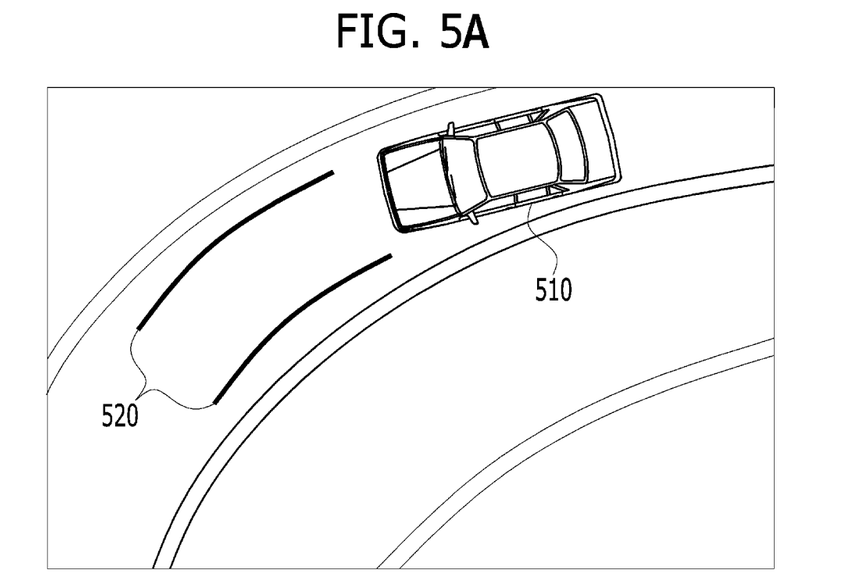
FIGS. 5A and 5B shows an example of a form in which a forward traveling assistance line is displayed when the vehicle turns a corner according to an embodiment of the present disclosure.
Figure 5B:
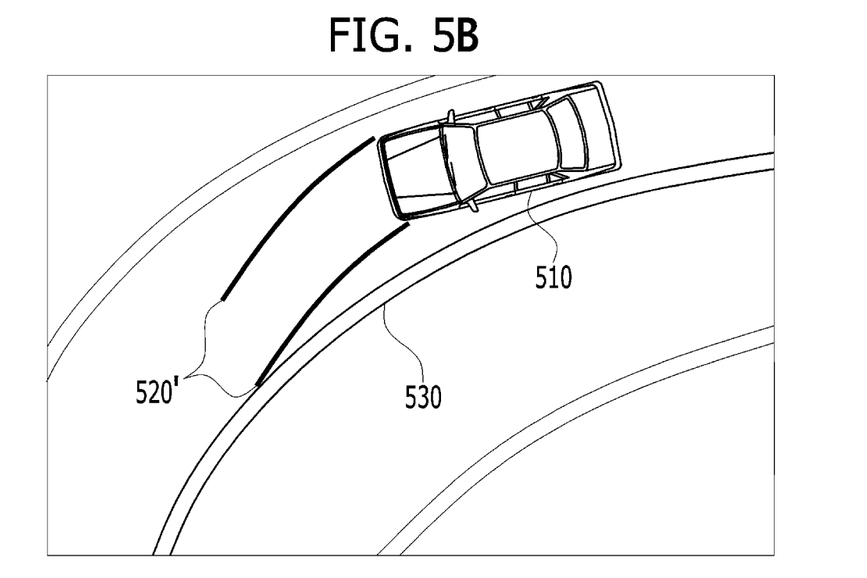

FIGS. 5A and 5B show an example of the form in which a forward traveling assistance line is displayed when the vehicle turns a corner according to an embodiment of the present disclosure.

Referring to FIG. 5A, when the current steering angle is maintained corresponding to the steering movement of the steering wheel, a forward traveling assistance line 520, which indicates the expected traveling route of the vehicle 510, may be displayed on the road. Therefore, when the driver steers the steering wheel in a direction inappropriate for the corner, as shown in FIG. 5B, the driver may quickly realize that the vehicle 510 will travel over the centerline 530 of the road based on a forward traveling assistance line 520', thereby enabling safe driving.

The form in which a reverse parking assistance line is displayed will now be described with reference to FIGS. 6 to 7D.

Figure 6:
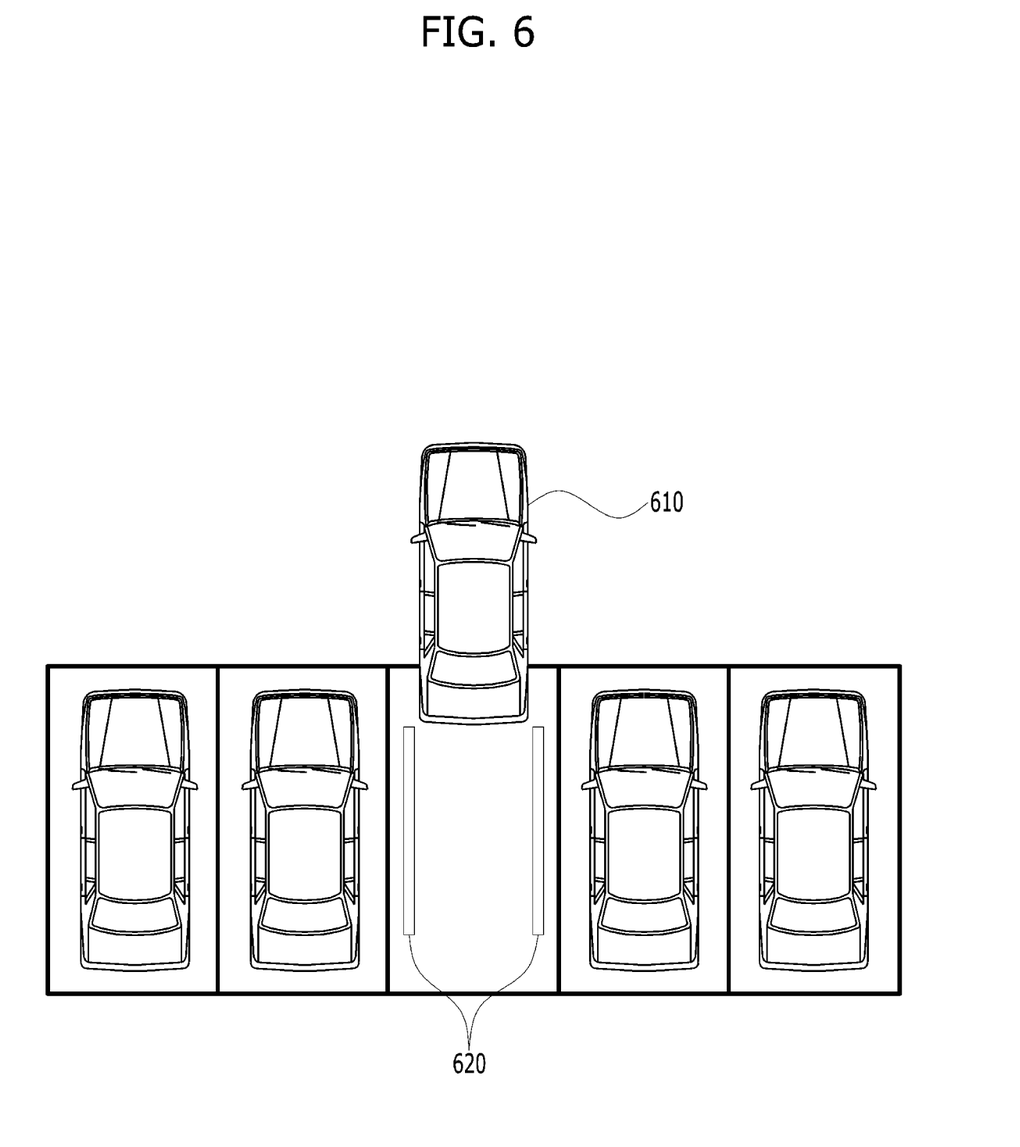
FIG. 6 shows an example of a form in which a reverse parking assistance line is displayed during reverse parking of the vehicle according to an embodiment of the present disclosure.

FIG. 6 shows an example of the form in which a reverse parking assistance line is displayed during reverse parking of the vehicle according to an embodiment of the present disclosure.

Referring to FIG. 6, upon determining that the vehicle 610 is traveling backwards through the traveling state recognition device 214, the projection information controller 231 may project a reverse parking assistance line 620 through the rear projector 234. In this case, the driver may confirm the reverse parking assistance line 620 displayed on the road with the naked eye through the side mirror, and the reverse parking assistance line 620 corresponding to the width of the vehicle may also be displayed in the image of the rear view camera, thereby enabling convenient parking. In addition, nearby pedestrians and vehicles may also visually confirm the reverse parking assistance line 620, and thus may easily recognize that the vehicle will move in the direction indicated by the reverse parking assistance line 620. Therefore, traffic safety may be improved.

FIGS. 7A-7D show an example of the form in which a reverse parking assistance line is displayed during reverse parking of the vehicle using the smart parking assistance system (SPAS) according to an embodiment of the present disclosure.

Figure 7A:
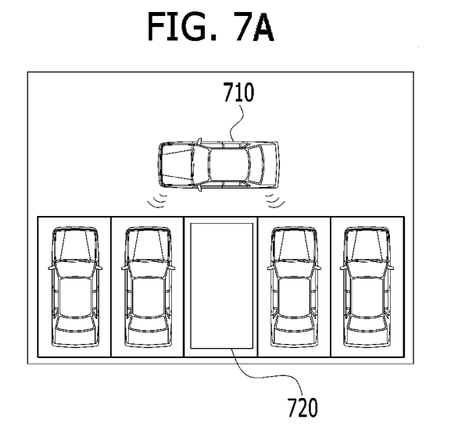
FIG. 7A-7D show an example of a form in which a reverse parking assistance line is displayed during reverse parking of the vehicle using a smart parking assistance system according to an embodiment of the present disclosure.
Figure 7B:
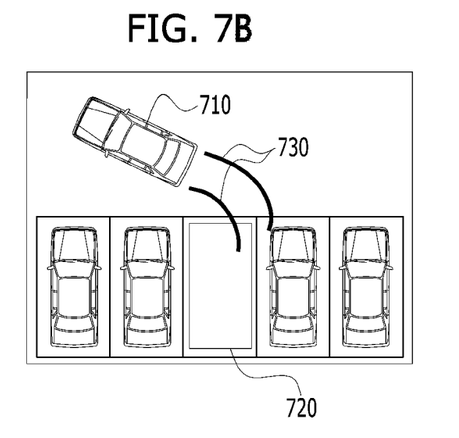
Figure 7C:
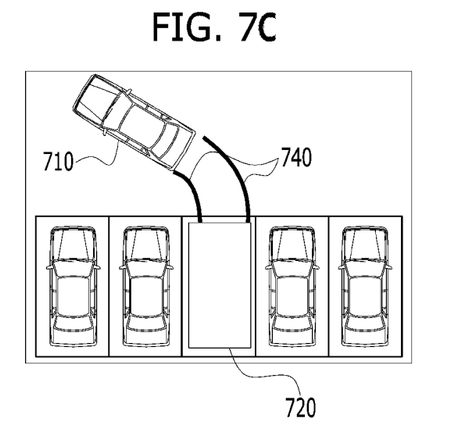
Figure 7D:
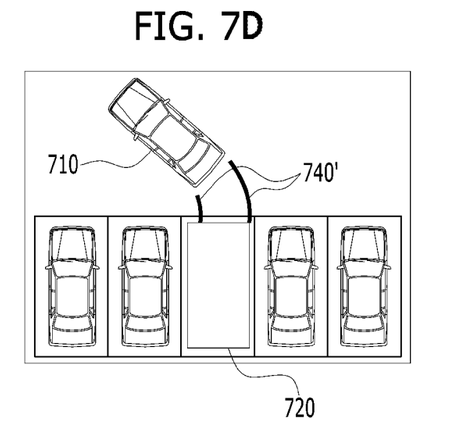

When the SPAS is applied, as shown in FIG. 7A, the vehicle 710 may confirm a parking space 720 through a sensor. If the curvature of a reverse parking assistance line 730 depends only on the steering angle of the steering wheel, as shown in FIG. 7B, the reverse parking assistance line 730 may be displayed in a form that does not match the sensed parking space 720 due to the current steering angle of the steering wheel. However, the SPAS calculates a route, along which the vehicle is parked into the parking space 720, in advance in an automatic parking mode and manipulates the steering wheel based on the calculation, and the information regarding the calculated route is transmitted to the projection information controller 231 in advance. Accordingly, as shown in FIG. 7C, a reverse parking assistance line 740 may be displayed so as to indicate the parking route calculated irrespective of the current steering angle of the steering wheel. In this case, the projection information controller 231, as shown in FIG. 7D, may perform control such that a reverse parking assistance line 740' is displayed on a fixed spot even when the vehicle 710 travels the parking route by correcting the curvature and location of the reverse parking assistance line 740', which is projected in real time as the vehicle travels the parking route. In this case, since the actual route along which the vehicle is parked is displayed on a fixed spot from the beginning of the parking, nearby pedestrians or vehicles may predict the movement of the vehicle more accurately. Therefore, traffic safety may be improved.

Figure 8A:
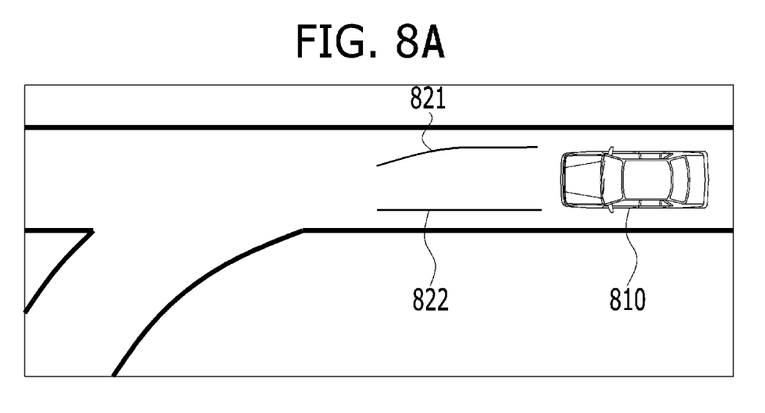
FIGS. 8A-8C show an example of a form in which a turning point is displayed in the vehicle according to an embodiment of the present disclosure.
Figure 8B:
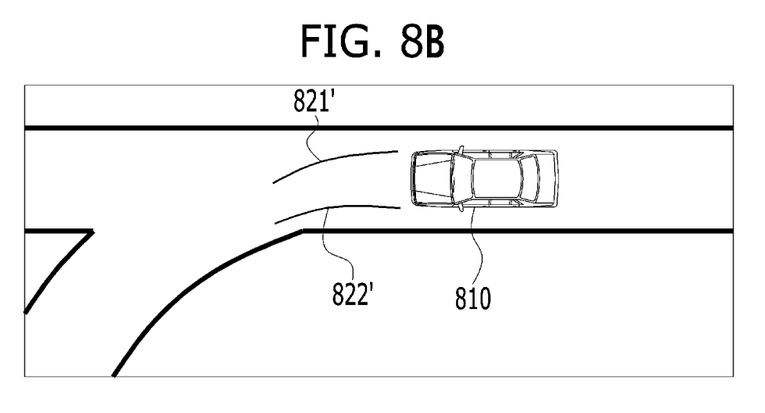

Next, the form in which a turning point is displayed will be described with reference to FIGS. 8A and 8B. FIGS. 8A and 8B show an example of the form in which a turning point is displayed in the vehicle according to an embodiment of the present disclosure.

Referring to FIG. 8A, as the vehicle 810 approaches a left-turning point, the shape of a left forward traveling assistance line 822 may be maintained, but a right forward traveling assistance line 821 may be gradually bent to the left.

As the vehicle 810 comes closer to the left-turning point, as shown in FIG. 8B, a right forward traveling assistance line 821' may be bent further to the left, and a left forward traveling assistance line 822' may also start to be bent to the left.

Figure 8C:
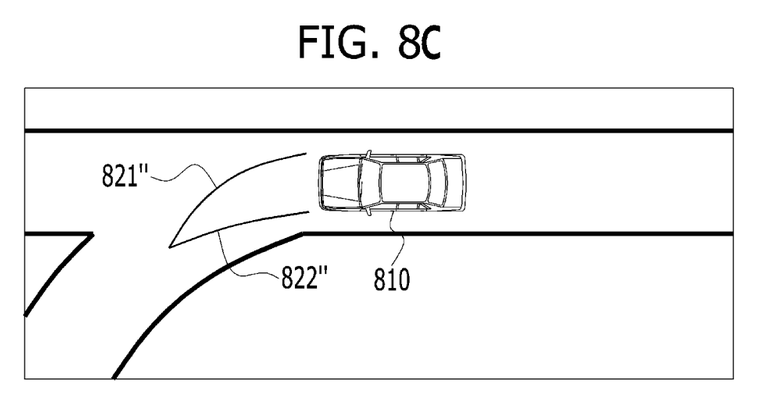

Thereafter, when the vehicle 810 reaches the left-turning point, as shown in FIG. 8C, a right forward traveling assistance line 821" and a left forward traveling assistance line 822" may be displayed so as to be bent toward the road on the left.

In this case, the driver may intuitively recognize the degree of proximity to the turning point and the precise location of the turning point.

Figure 9A:
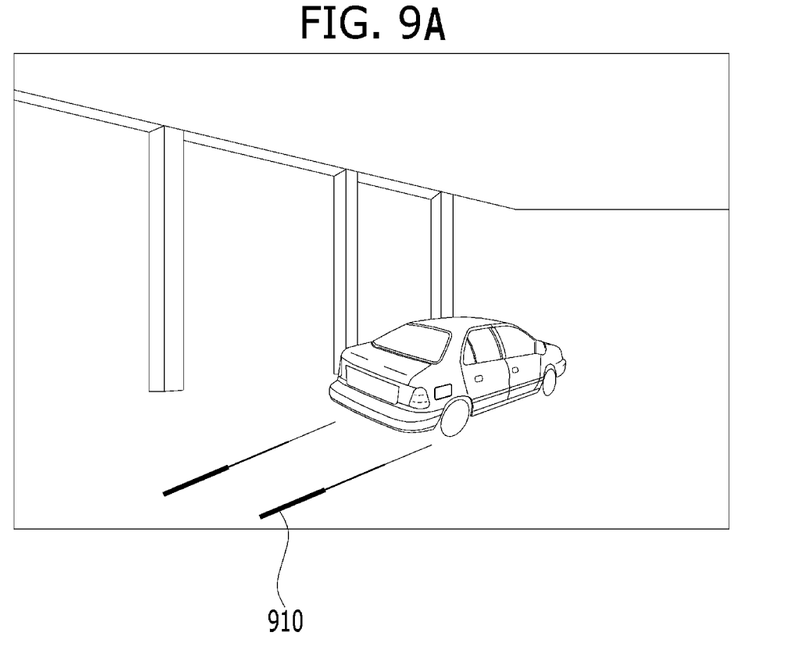
FIGS. 9A and 9B shows examples of a traveling assistance line and a parking assistance line according to another embodiment of the present disclosure.
Figure 9B:
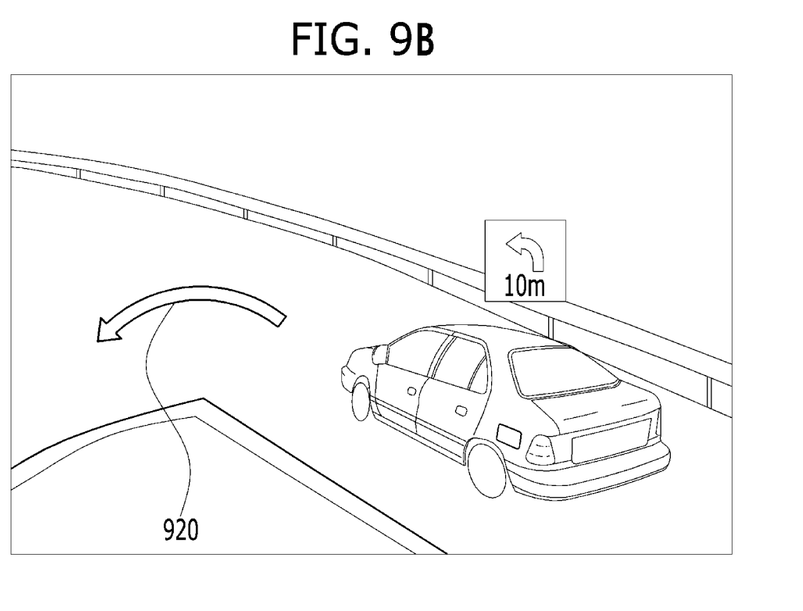

FIGS. 9A and 9B show examples of a traveling assistance line and a parking assistance line according to another embodiment of the present disclosure.

Referring to FIG. 9A, a reverse parking assistance line 910 may be displayed in a different color depending on the distance from the vehicle. In this case, the driver may perceive the danger or spacing depending on the distance using the color.

Referring to FIG. 9B, a forward traveling assistance line 920 may have any of various shapes other than a line shape, for example, may have an arrow shape 920.

Figure 10:
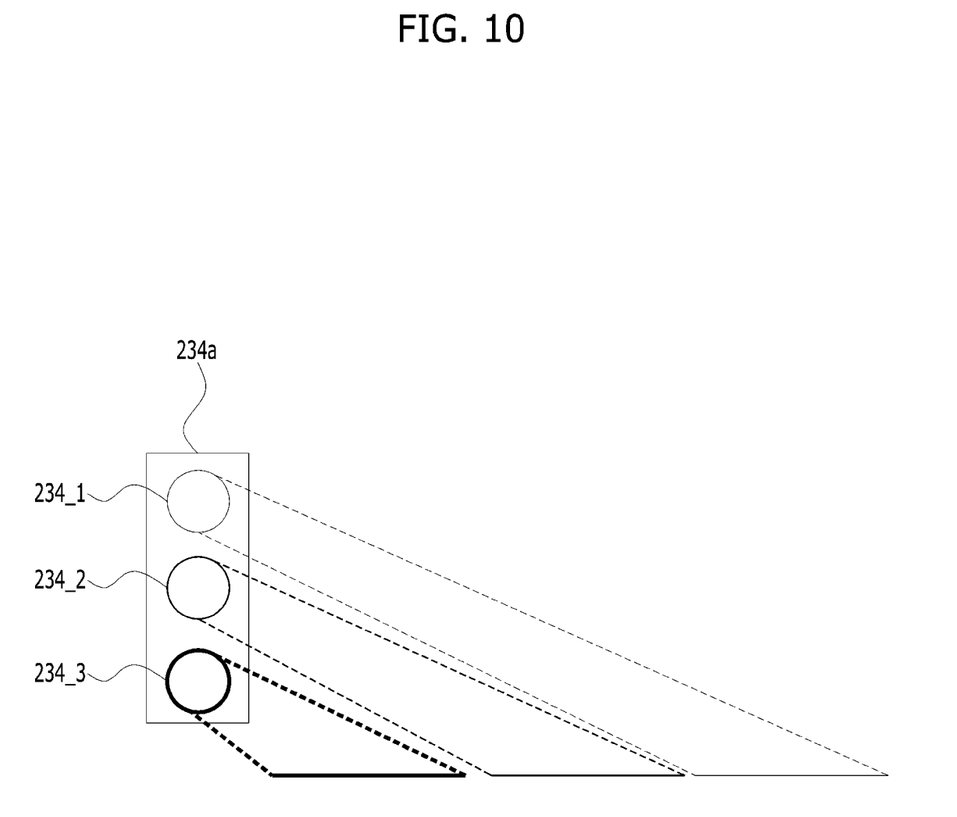
FIG. 10 shows an example of a configuration of a rear projector according to another embodiment of the present disclosure.

FIG. 10 shows an example of a configuration of a rear projector according to another embodiment of the present disclosure.

Referring to FIG. 10, a rear projector 234a according to the embodiment may be configured such that a plurality of laser beam sources $234a\_1$, $234a\_2$ and $234a\_3$, which emit laser beams having different colors, are arranged in the vertical direction. Here, the projection angle is controlled such that the lowermost laser beam source $234a\_3$ projects a line on the nearest spot on the road, such that the intermediate laser beam source $234a\_2$ projects a line on an intermediate spot on the road, and such that the uppermost laser beam source $234a\_1$ projects a line on the farthest spot on the road. When the rear projector 234a is disposed at both lateral sides of the rear side of the vehicle, the reverse parking assistance line 910 shown in FIG. 9A may be projected.

Needless to say, the above configuration of the projector is merely illustrative. The projectors 233 and 234 according to the embodiment may include more or fewer light sources than the above configuration, or may have different arrangement types of light sources. For example, a plurality of light sources having different radiation angles from each other may be provided, and the light sources may be controlled so as to be selectively turned on so as to naturally generate a curved line. Alternatively, the light sources may be provided with slits so as to project lines having different curvatures from each other.

According to the embodiments of the present disclosure, when driving on a narrow road such as an alleyway, a highway toll gate, or the like, it is possible for the driver to easily recognize whether the vehicle can pass through the narrow path using the line displayed on the road in order to indicate the width of the vehicle, thereby preventing a collision. In addition, when driving on a curved road such as an entrance/exit of an underground parking lot, an interchange (IC), or the like, it is also possible for the driver to easily recognize the width of the vehicle depending on the traveling direction of the vehicle, thereby preventing a collision.

In addition, during reverse parking of the vehicle, it is possible to visually warn nearby pedestrians or other vehicles of the reverse parking, and it is also possible for the driver to park the vehicle parallel to a parking line using a laser assistance line, which is reflected in the side mirror and is displayed in the image of the rear view camera.

In addition, when driving to the destination set by the navigation system, a turning direction is directly displayed on the road, thus preventing an accident attributable to negligence in looking ahead. In addition, an arrow indicating the turning direction is directly displayed on the turning point on the road, thus preventing the driver from turning the vehicle at the wrong point due to a distance error.

The various embodiments disclosed herein, including embodiments of the vehicle capable of displaying information on a road and/or elements thereof including, but not limited to, the traveling state recognition device 214, the laser projection system 230 including the projection information controller 231 and the laser brightness controller 232, can be implemented using one or more processors coupled to a memory (or other non-transitory computer readable recording medium) storing computer-executable instructions and/or algorithm for causing the processor(s) to perform the operations and/or functions described above. The disclosure described above may be implemented as computer-readable code in a non-transitory, or transitory, computer readable recording medium in which a program is recorded. The computer readable recording medium is any data storage device that can store data and program which can thereafter be read and executed by a computer and/or a processor to perform the above described operations and/or functions. The computer-readable recording media may include all kinds of recording devices in which data readable by computer systems is stored. The computer-readable recording media include a Hard Disk Drive (HDD), a Solid State Drive (SSD), a Silicon Disk Drive (SDD), a ROM, a RAM, a CD-ROM, a magnetic tape, a floppy disk, an optical data storage system, etc.

As is apparent from the above description, a vehicle according to at least one embodiment of the present disclosure configured as described above is capable of effectively providing a driver with information necessary for driving by displaying the information on a road.

It will be appreciated by those skilled in the art that the effects achievable through the present disclosure are not limited to those that have been specifically described hereinabove, and other effects of the present disclosure will be more clearly understood from the above detailed description.

The above detailed description is not to be construed as limiting the present disclosure in any aspect, and is to be considered by way of example. The scope of the present disclosure should be determined by reasonable interpretation of the accompanying claims, and all equivalent modifications made without departing from the present disclosure should be included in the following claims.

What is claimed is:

1. A method of displaying information on a road for a vehicle, the method comprising:
    recognizing a traveling state;
    determining at least one of a location or a curvature of a laser assistance line that is to be projected on a road from a front laser projector or a rear laser projector based on the recognized traveling state and a steering angle of the vehicle; and
    projecting the laser assistance line based on a result obtained from the determining,
    wherein the projecting the laser assistance line includes: upon sensing that a laser assistance line having a first color is projected from a nearby vehicle, controlling the laser assistance line to be projected in a second color that is different from the first color.

2. The method according to claim 1, wherein, when the recognized traveling state is recognized to be a backward traveling state,
    the determining at least one of the location or the curvature of the laser assistance line comprises determining at least one of a location or a curvature of a laser assistance line that is to be projected on a road behind the vehicle from the rear laser projector.

3. The method according to claim 2, further comprising: when a parking space is recognized by a smart parking assistance system (SPAS),
    determining a parking route to the recognized parking space,
    wherein the determining at least one of the location or the curvature of the laser assistance line comprises determining at least one of the location or the curvature of the laser assistance line that is to be projected on the road behind the vehicle from the rear laser projector so as to correspond to the determined parking route irrespective of a current steering angle.

4. The method according to claim 2, wherein the laser assistance line to be projected on a road behind the vehicle is projected in at least two different colors depending on a distance from the vehicle.

5. The method according to claim 1, wherein, when the recognized traveling state is recognized to be a forward traveling state,
    the determining at least one of the location or the curvature of the laser assistance line comprises determining at least one of a location or a curvature of a laser assistance line that is to be projected on a road ahead of the vehicle from the front laser projector.

6. The method according to claim 5, wherein the laser assistance line to be projected on a road ahead of the vehicle corresponds to a forward traveling direction depending on the steering angle and to a width of the vehicle.

7. The method according to claim 5, further comprising:
    determining a turning point in a traveling route using at least one of GPS position information, destination information, or detailed map information,
    wherein the determining at least one of the location or the curvature of the laser assistance line comprises performing control such that the laser assistance line indicates the turning point.

8. The method according to claim 7, wherein the laser assistance line to be projected on the road ahead of the vehicle is varied depending on a distance from the vehicle to the turning point.

9. The method according to claim 1, wherein the laser assistance line to be projected on the road comprises a left laser assistance line and a right laser assistance line, and
    wherein the left laser assistance line and the right laser assistance line are spaced apart from each other by a distance corresponding to a width of the vehicle, and have one of a straight line shape and a curved line shape depending on the steering angle.

10. A vehicle comprising:
    a steering angle sensor for sensing a steering angle;
    a laser projector for projecting a laser assistance line on a road; and
    a projection information controller for determining at least one of a location or a curvature of the laser assistance line that is to be projected on a road from the laser projector based on a traveling state of the vehicle and the steering angle,
    wherein the laser projector comprises at least one of a front laser projector or a rear laser projector, and projects the laser assistance line based on a determination result of the projection information controller,
    wherein the laser projector projects the laser assistance line in a plurality of different colors, and
    wherein, upon sensing that a laser assistance line having a first color is projected from a nearby vehicle, the projection information controller performs control such that the laser assistance line is projected in a second color that is different from the first color.

11. The vehicle according to claim 10, wherein, when the traveling state is recognized as a backward traveling state, the projection information controller determines at least one of a location or a curvature of a laser assistance line that is to be projected on a road behind the vehicle from the rear laser projector.

12. The vehicle according to claim 11, further comprising:
a smart parking assistance system (SPAS) for recognizing a parking space and determining a parking route to the recognized parking space,
wherein the projection information controller determines at least one of the location or the curvature of a laser assistance line that is to be projected on the road behind the vehicle from the rear laser projector so as to correspond to the determined parking route irrespective of a current steering angle.

13. The vehicle according to claim 11, wherein the laser assistance line to be projected on the road behind the vehicle is projected in at least two different colors depending on a distance from the vehicle.

14. The vehicle according to claim 10, wherein, when the traveling state is recognized as a forward traveling state,
the projection information controller determines at least one of a location or a curvature of a laser assistance line that is to be projected on a road ahead of the vehicle from the front laser projector.

15. The vehicle according to claim 14, wherein the laser assistance line to be projected on the road ahead of the vehicle corresponds to a forward traveling direction depending on the steering angle and to a width of the vehicle.

16. The vehicle according to claim 14, wherein the projection information controller determines a turning point in a traveling route using at least one of GPS position information, destination information, or detailed map information, and controls the front laser projector such that the laser assistance line indicates the turning point.

17. The vehicle according to claim 16, wherein the laser assistance line to be projected on a road ahead of the vehicle is varied depending on a distance from the vehicle to the turning point.

18. The vehicle according to claim 10, wherein the laser assistance line to be projected on the road comprises a left laser assistance line and a right laser assistance line, and
wherein the left laser assistance line and the right laser assistance line are spaced apart from each other by a distance corresponding to a width of the vehicle, and have one of a straight line shape and a curved line shape depending on the steering angle.

19. The vehicle according to claim 10, further comprising:
a laser brightness controller configured to, upon determining that an obstacle is present near the vehicle, perform control such that the laser assistance line is not projected on the obstacle.

* * * * *